United States Patent [19]

Mori

[11] E Re. 28,888

[45] Reissued June 29, 1976

[54] COOKING TIME ADJUSTING ARRANGEMENT FOR USE IN ELECTRONIC OVEN

[75] Inventor: Fumiko Mori, Osaka, Japan

[73] Assignee: Matsushita Electric Industrial Co., Ltd., Osaka, Japan

[22] Filed: July 11, 1975

[21] Appl. No.: 595,302

Related U.S. Patent Documents

Reissue of:

[64] Patent No.: 3,848,105
Issued: Nov. 12, 1974
Appl. No.: 346,795
Filed: Apr. 2, 1973

[30] Foreign Application Priority Data

Apr. 6, 1972 Japan ..... 47-41112[U]
Apr. 6, 1972 Japan ..... 47-41113[U]

[52] U.S. Cl. ..... 219/10.55 B; 116/124.1 R; 116/135; 219/10.55 E; 99/325; 58/151

[51] Int. Cl.[2] ..... H05B 9/06

[58] Field of Search..... 219/10.55 B, 10.55 E, 219/10.55 R, 10.55 M; 116/DIG. 3, 37, 46, 124 H, 124.1, 129 G, 129 H, 129 F, 129 Q, 129 P, 129 T, 133, 134, 135, 131; 58/152 R, 152 F, 145, 149, 151, 21.13, 33, 39.5, 21.15, 50 R; 99/325; 126/197

[56] References Cited

UNITED STATES PATENTS

| | | | |
|---|---|---|---|
| 2,052,701 | 9/1936 | Detar | 116/124.1 R |
| 2,725,029 | 11/1955 | Ammerman | 116/135 X |
| 2,876,764 | 3/1959 | Guttner et al. | 116/135 |
| 3,324,273 | 6/1967 | Ogburn | 219/10.55 B |
| 3,622,772 | 11/1971 | Koiso et al. | 116/124.1 R |

FOREIGN PATENTS OR APPLICATIONS

| | | |
|---|---|---|
| 2,023,242 | 11/1971 | Germany |

*Primary Examiner*—Bruce A. Reynolds
*Attorney, Agent, or Firm*—Wenderoth, Lind & Ponack

[57] ABSTRACT

A cooking time adjusting arrangement for use in an electronic oven is disclosed. The arrangement includes a display device representing a plurality of data such as various menus, the number and/or quantity of each of the menus with or without cooking times, setting of a timer device to operate the electronic oven for a predetermined cooking time proper to a selected one of the menus being performed with reference to the reading of the display device. The cooking time adjustment arrangement is intended for facilitating the use of the electronic oven without substantially requiring any experience in handling the oven itself.

15 Claims, 40 Drawing Figures

COOKING TIME ADJUSTING ARRANGEMENT FOR USE IN ELECTRONIC OVEN

Figure 2:
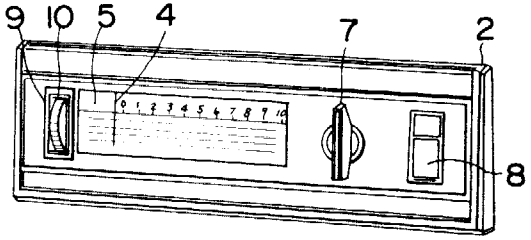

Matter enclosed in heavy brackets [ ] appears in the original patent but forms no part of this reissue specification; matter printed in italics indicates the additions made by reissue.

The present invention generally relates to an electronic or microwave oven and, more particularly to a cooking time adjusting arrangement for use in the electronic oven.

An electronic oven to which the present invention pertains and which is now in wide use essentially comprises an oven-defining structure having a hingedly supported door adapted to close an access opening formed at one side of the oven-defining structure, a magnetron for generating high frequency energy for heat-treating food material within the oven-defining structure, and a timer unit for adjusting the period of time during which the magnetron is operated so as to apply the high frequency energy to one particular food material. With the electronic oven, food items can be heat-treated or cooked in an extraordinarily short period of time, for example, on the order of seconds, and, in view of the relatively high speed of cooking, the timer unit plays an important role in determining the cooking time, i.e., the period of time during which the magnetron is operated.

The timer unit heretofore largely employed in the conventional electronic oven includes an operating shaft, an operating knob having a pointer needle and a calibrated scale imprinted, or otherwise embossed, with a plurality of sequential digits representing the cooking time. The operating knob is rigidly mounted on the operating shaft for transmitting a rotational force of the operating knob to said operating shaft thereby to operate the timer unit in accordance with the reading of the pointer needle then registered with any one of the digits on the calibrated scale.

In such a conventional arrrangement, in order to set the timer unit so as to select a proper cooking time with respect to any one particular food material or item, the user is required to refer to a cooking book in which the proper cooking time for the particular food material or item is described, or otherwise to rely on the memory.

In practice, there are a number of food materials and food items that can be heat-treated or cooked by the electronic oven and, in view of this, relying on memory often results in confusion, in which case one particular food material or item cannot be successfully heat-treated or cooked. The cooking book may be a reliable friend to the user, but it will be difficult, or inconvenient if not difficult, to find which book discloses a menu the user intends to serve and where such menu is described in the same book.

Some types of conventional electronic ovens are imprinted with a plurality of different menus that can be cooked in different cooking times. However, the number of the menus that can be imprinted in the vicinity of the timer unit is limited because of a limited space available for this purpose.

Accordingly, an essential object of the present invention is to provide a cooking time adjusting arrangement for use in the electronic oven wherein a display device is provided for permitting the user to set the timer unit with reference to the display device.

Another object of the present invention is to provide a cooking time adjusting arrangement of the type above referred to, wherein a lighting device is further provided for illuminating the display device.

A further object of the present invention is to provide a cooking time adjusting arrangement of the type above referred to, which can be manufactured at a relatively low cost into a single unit substantially independent of the body of an electronic oven to which the concept of the present invention can be applicable.

A still further object of the present invention is to provide a cooking time adjusting arrangement of the type above referred to, which enables a beginner to of the commercially available electronic ovens merely by replacing the front instrument panel with that according to the present invention.

A still further object of the present invention is to provide a cooking time adjusting arrangement of the type above referred to, which enables a beginner of to readily handle the electronic oven while preventing the novice from over or undercooking a desired food item.

A still further object of the present invention is to provide a cooking time adjusting arrangement of the type above referred to, wherein cooking by the use of an electronic oven can be performed by merely requiring the user to refer to the reading on the display device.

Figure 1:
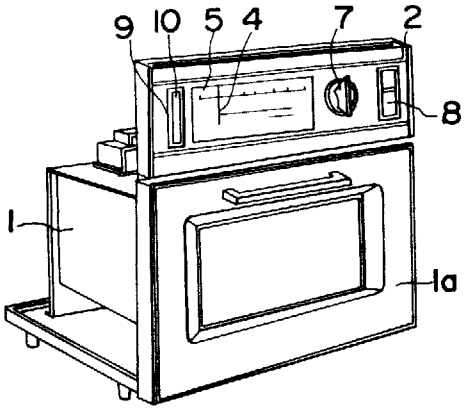
Figure 3:
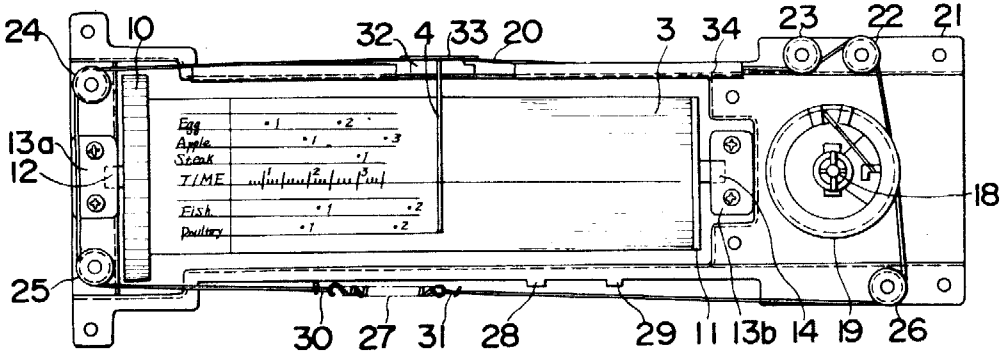
Figure 4:
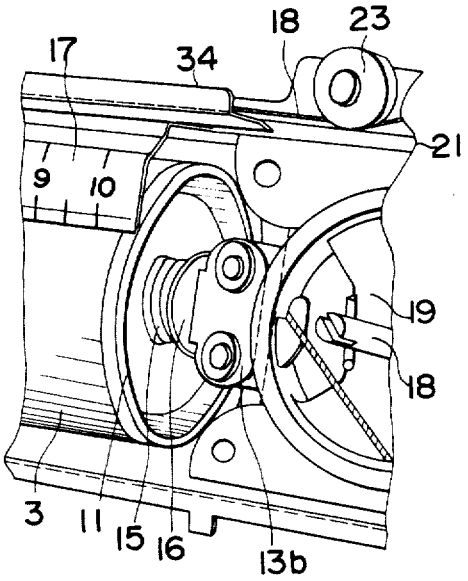
Figure 4:
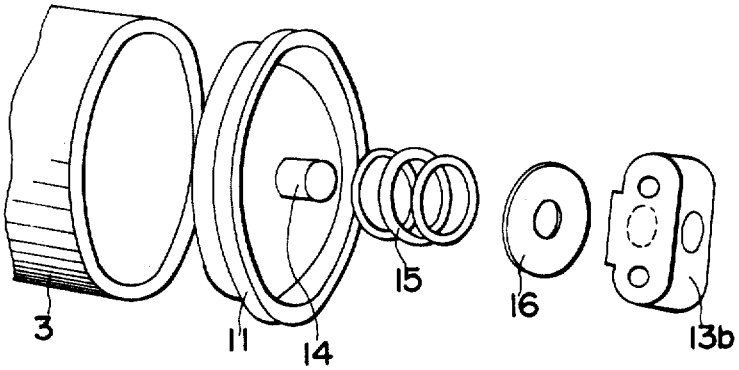
Figure 5:
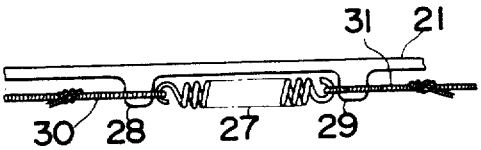
Figure 5:
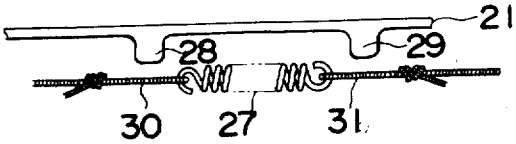
Figure 6:
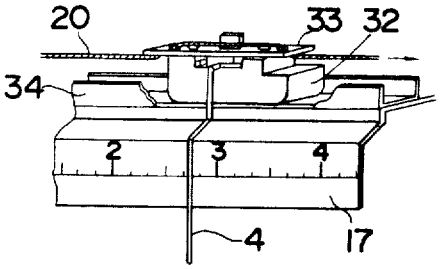
Figure 7:
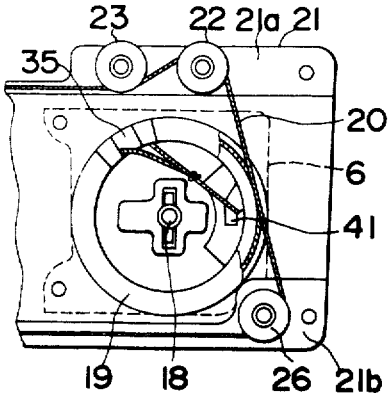
Figure 8:
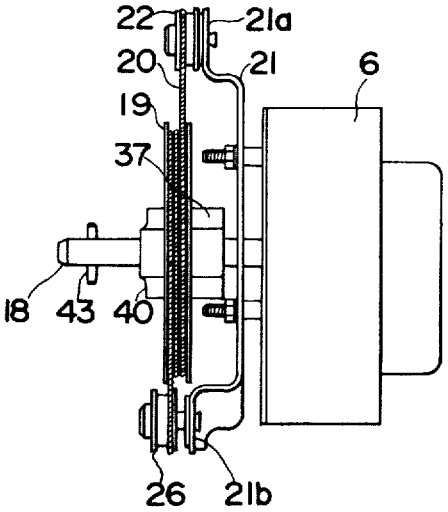
Figure 11:
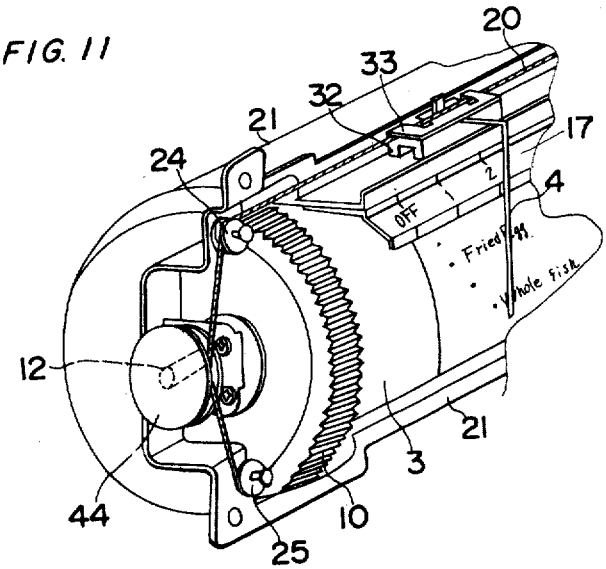
Figure 12:
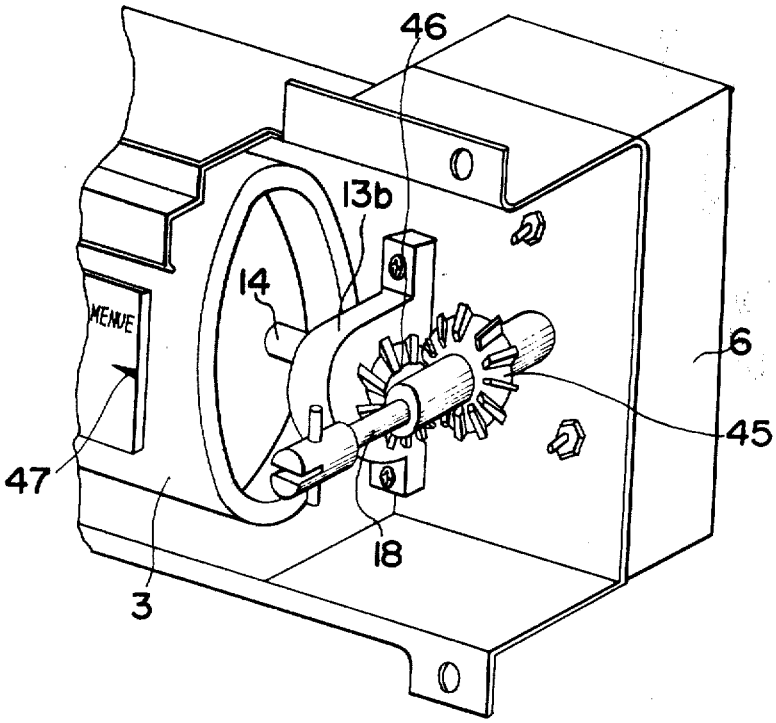
Figure 13:
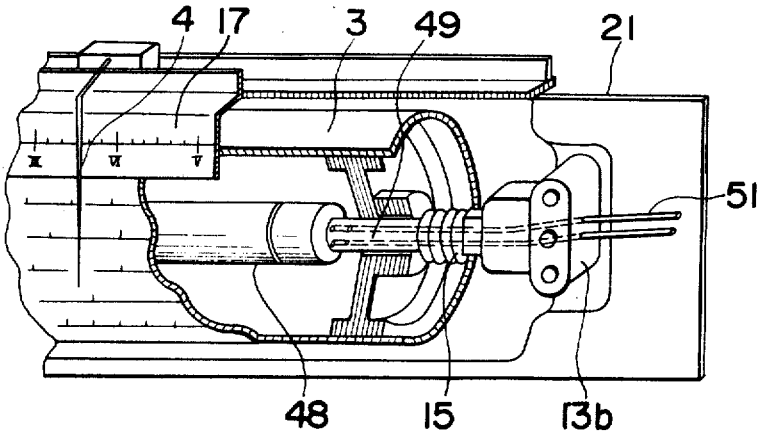
Figure 14:
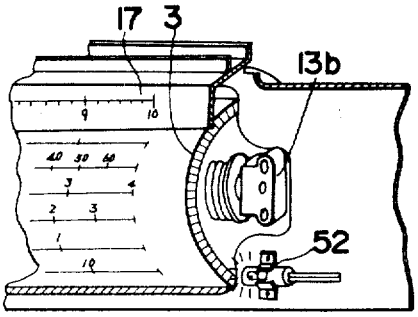
Figure 14:
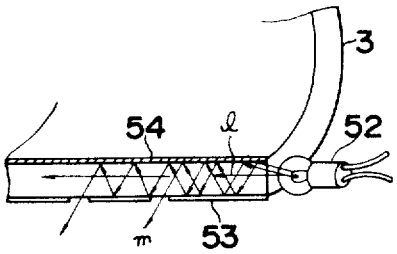
Figure 16:
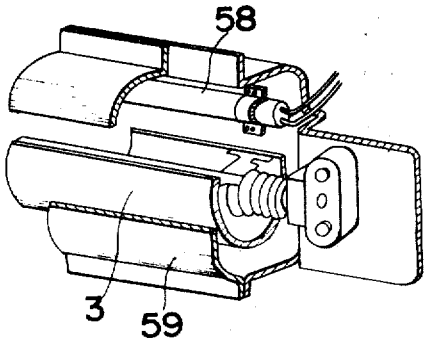
Figure 16:
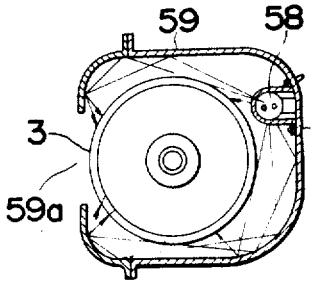
Figure 17:
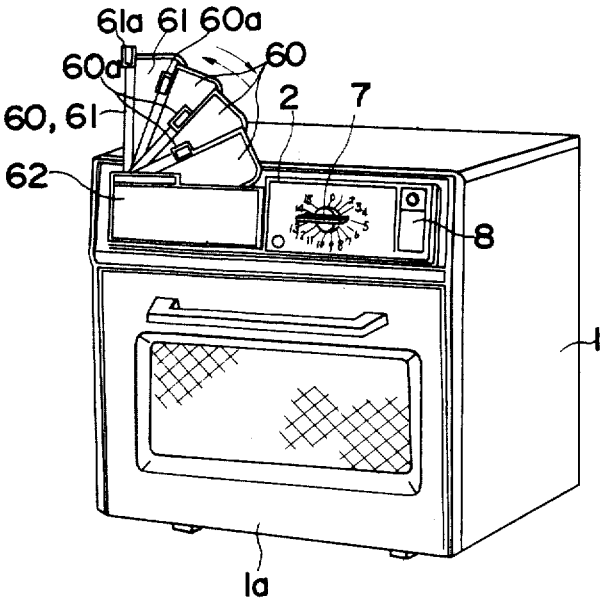
Figure 18:
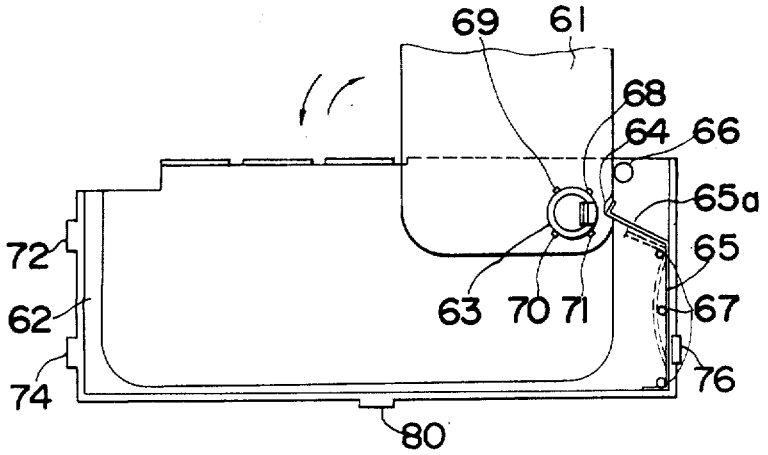
Figure 19:
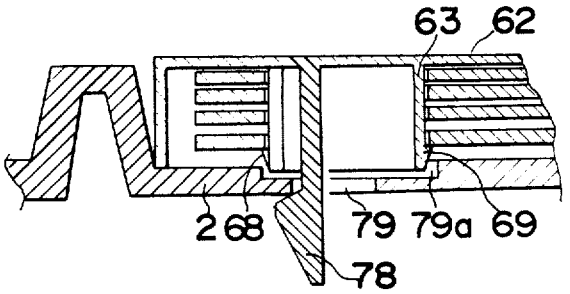
Figure 20:
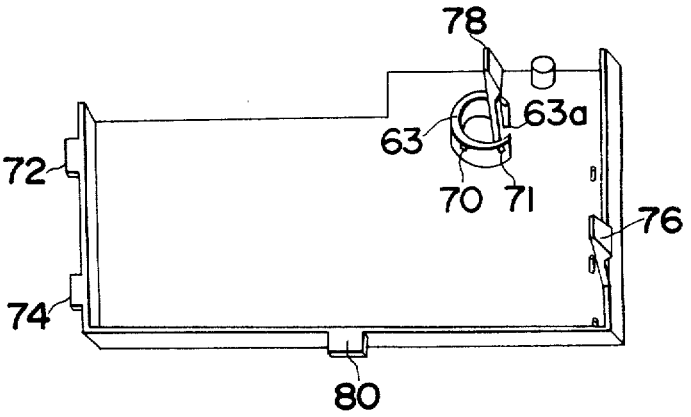
Figure 21:
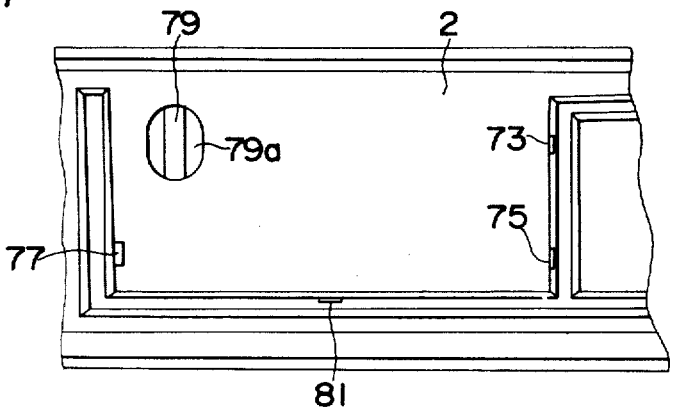
Figure 22:
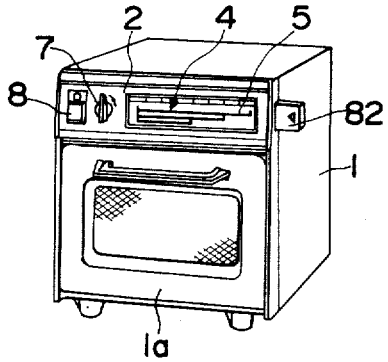
Figure 22:
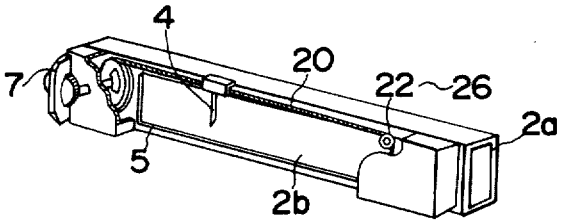
Figure 22:
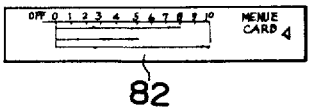
Figure 23:
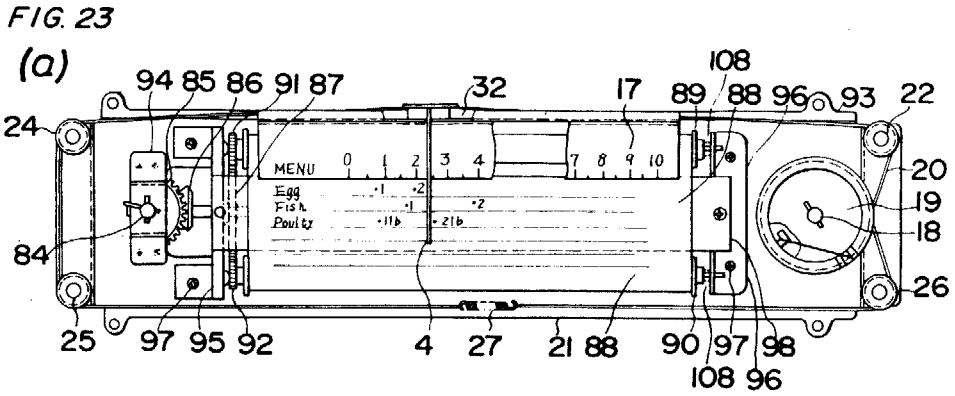
Figure 24:
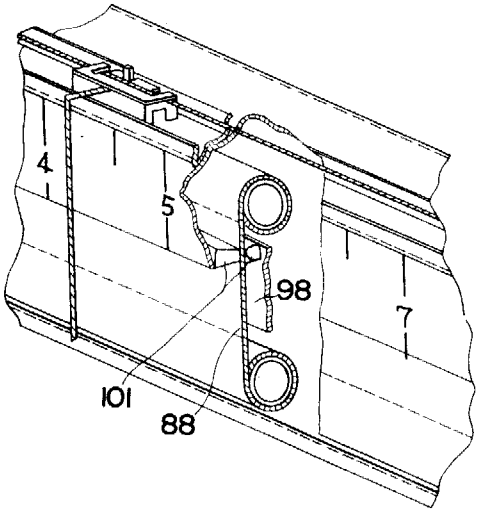
Figure 23:
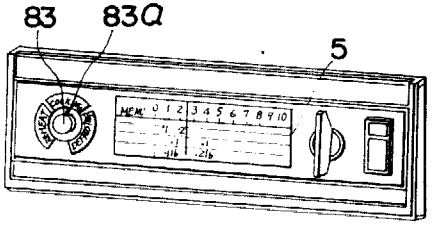
Figure 25:
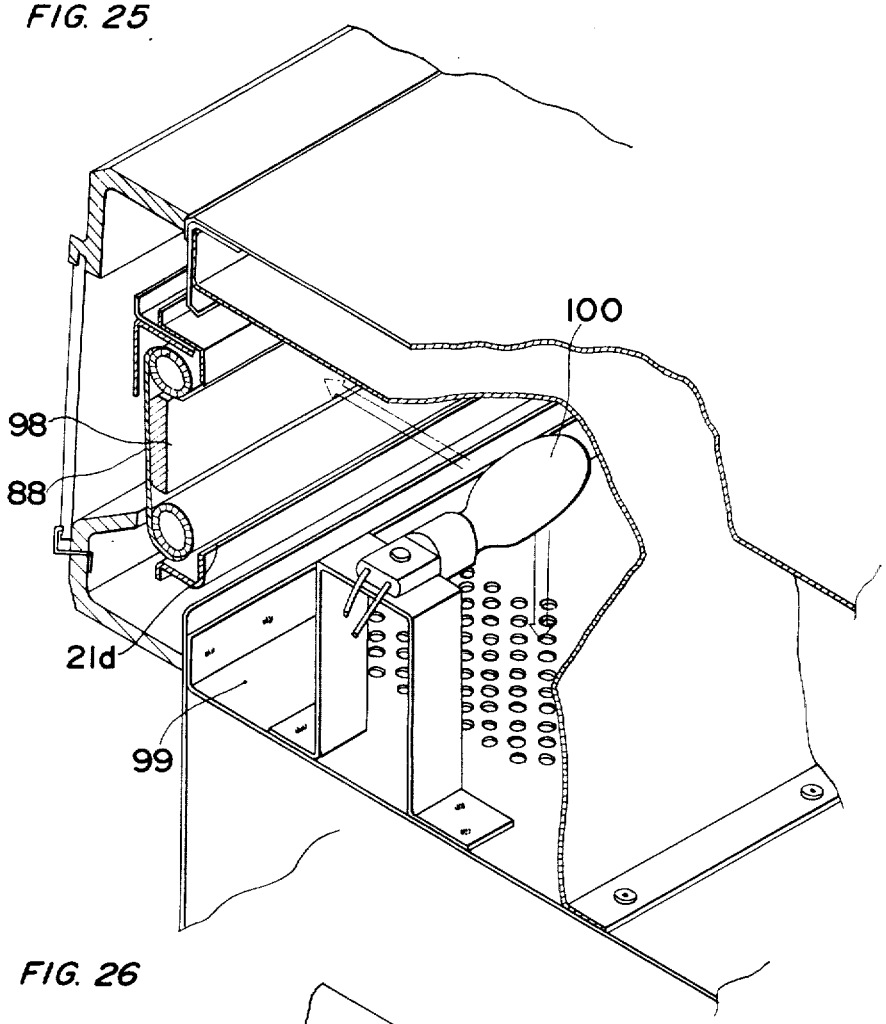
Figure 26:
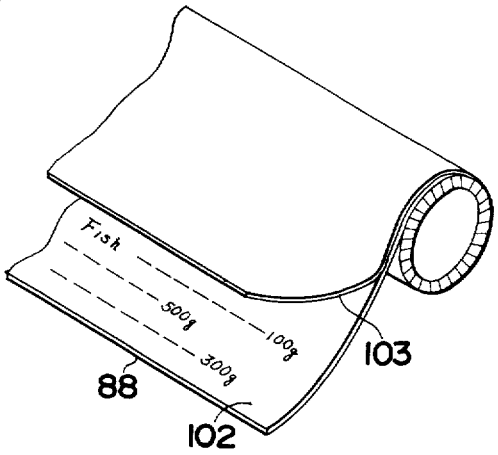
Figure 27:
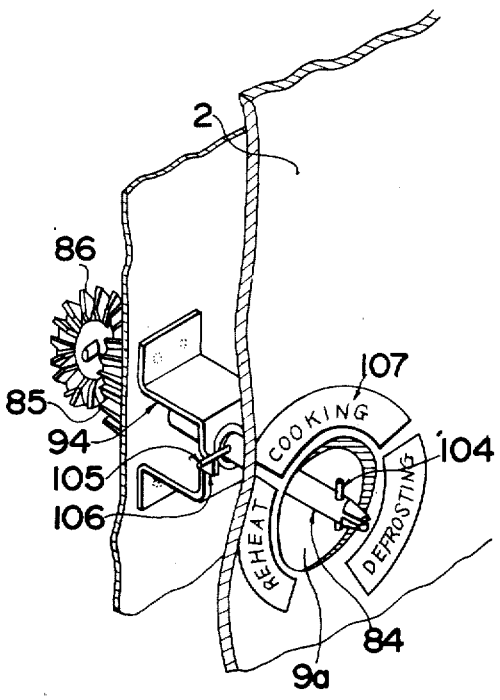
Figure 28:
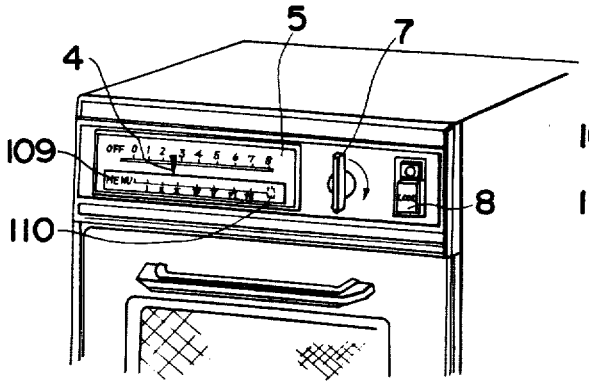
Figure 28:
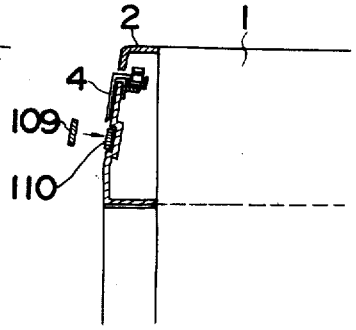

These and other objects and features of the present invention will become apparent from the following description taken in conjunction with preferred embodiments thereof with reference to the accompanying drawings, in which;

FIG. 1 is a schematic perspective view showing an electronic oven, with a back covering removed away, according to one preferred embodiment of the present invention, FIG. 2 is a schematic perspective view of a cooking time adjusting arrangement of FIG. 1, shown on an enlarged scale, FIG. 3 is a front elevational view, on an enlarged scale, of the cooking time adjusting arrangement of FIG. 2, with a front covering removed away, FIG. 4(a) is a schematic perspective view of an essential portion of the arrangement of FIG. 2, showing the details of a drum mounting, FIG. 4(b) is an exploded view of a portion of FIG. 4(a), FIG. 5(a) and (b) illustrate a method of connecting the opposite ends of a cable employed in the arrangement of FIG. 2, FIG. 6 is a perspective view, on an enlarged scale, of a pointer needle connected to the cable, FIG. 7 is a front elevational view of a drive wheel mounted on the timer operating shaft for moving the cable, FIG. 8 is a side view of FIG. 7, FIG. 9(a) is a perspective view of the drive wheel, FIG. 9(b) is a perspective view, on an enlarged scale, of a half portion of the drive wheel shown in FIG. 9(a), showing the cross-sectional appearance thereof, FIG. 10(a) is a front elevational view, on an enlarged scale, of the drive wheel, showing one surface thereof, FIG. 10(b) is a top plan view of FIG. 10(a), FIG. 10(c) is a similar view to FIG. 10(a), showing the opposite surface thereof, FIG. 11 is a perspective view of one end of the drum according to another embodiment of the present invention, FIG. 12 is a perspective view of the opposite end of the drum according to a further embodiment of the present invention, FIG. 13 is a perspective view of the arrangement incorporating a drum lighting unit according to a still further embodiment of the present invention, FIG. 14(a) is a modification of FIG. 13, FIG. 14(b) shows a manner of light transmission through the drum in the modification of FIG. 14(a), FIG. 15(a) is another modification of FIG. 13, FIG. 15(b) shows a manner of light transmission through the drum in another modification of FIG. 15(a), FIG. 16(a) is a further modification of FIG. 13, FIG. 16(b) shows a manner of light transmission through the drum in the further modification of FIG. 16(a), FIG. 17 is a schematic perspective view of the electronic oven having a pocket for accommodating a plurality of menu cards according to a still further embodiment of the present invention, FIG. 18 is a back plane view, on an enlarged scale, of the pocket showing the interior thereof, FIG. 19 is a cross sectional view of an essential portion of FIG. 18, FIG. 20 is a schematic perspective view of FIG. 18, with the menu cards removed away, FIG. 21 is a front elevational view of a portion of a mounting panel to which the pocket is attached, FIG. 22(a) is a schematic perspective view of the electronic oven having the display device composed of an interchangeable strip member according to a still further embodiment of the present invention, FIG. 22(b) is a schematic perspective view, on an enlarged scale, of an essential portion of FIG. 22(a) showing a manner of association between the pointer needle and the interchangeable strip member, FIG. 22(c) is a schematic diagram showing the details of the strip member, FIG. 23(a) is a similar view to FIG. 2, showing a still further embodiment of the present invention, FIG. 23(b) is a front elevational view of the embodiment of FIG. 23(a), with the front covering removed away, FIG. 24 is a schematic perspective view of an essential portion of FIG. 23(b), with a portion broken away to show the interior thereof, FIG. 25 is a schematic perspective view, on an enlarged scale, with a portion broken away to show the application of the lighting unit to the embodiment of FIG. 23(a), FIG. 26 is a schematic perspective view of a band of film having a protective covering according to a still further embodiment of the present invention, FIG. 27 is a schematic perspective view, on an enlarged scale, showing an operative connection between the timer operating shaft and a film winding mechanism employed in the embodiment of FIG. 23(a), FIG. 28(a) is a schematic perspective view of a portion of the electronic oven utilizing an interchangeable strip member having a magnetic member according to a still further embodiment of the present invention, and FIG. 28(b) is a schematic side sectional view showing the fitting position for the strip member having the magnetic member.

Before the description proceeds, it is to be noted that like parts are designated by like reference numerals throughout the accompanying drawings for the sake of brevity.

Referring first to FIGS. 1 and 2, the electronic oven to which the present invention is applicable comprises an oven-defining structure 1 of substantially cubic shape having a hingedly supported door 1a adapted to close an access opening through which food to be heat-treated is inserted into the oven-defining structure 1. An instrument panel 2 is provided above the door 1a and suitably supported in position by a framework, for example, a housing structure (not shown) for confining the oven-defining structure 1 therein. This instrument panel 2 is formed with a display window 5 through which a portion of a rotatable drum 3 having a plurality of menus imprinted on the peripheral surface thereof and a pointer needle 4 are exposed to the sight of the user and also with a substantially vertically extending slot 9 through which a portion of a drum rotating ring 10 for rotating the drum 3 is exposed for permitting the user to rotate the drum 3 to register one particular menu on the peripheral surface of the drum 3 with the pointer needle 4.

Provided to the right of the display window 5 is a timer operating knob 7 mounted on a timer operating shaft 18 (FIG. 3) loosely extending through the instrument panel 2, and a push-button type switch 8 operable so as to, upon closure thereof, initiate radiation of high frequency energy at the food within the oven-defining structure 1.

It is to be noted that a timer device 6 is constructed to be driven in synchronism with the radiation of high frequency energy, i.e., closure of the push-button type switch 8, and to interrupt an electric power supply to the magnetron (not shown) after a predetermined period of time set by the timer device 6 and has elapsed.

*The construction of the generator of high frequency energy, as well as structure to mount such generator with respect to the oven are conventional, and thus are not shown. Further, the manner of operatively coupling the timer device 6, the switch 8 and the generator may be any known such system, and thus is not shown or described in detail.*

The pointer needle 4, during the operation of the timer device 6, moves from one position corresponding to the cooking time proper to one particular food in the oven-defining structure 1 to another position, i.e., OFF position, thereby visually representing the elapse of the cooking time. For this purpose, the pointer needle 4 is operatively coupled with the timer operating shaft 18 in a manner as will be described later.

In any event, in the above arrangement, if the user desires to set the timer device 6 so as to operate the electronic oven for a certain period of time required for cooking or heat-treating one particular food item within the oven-defining structure 1, the user merely turns the timer operating knob 7 to such a position that the movable pointer needle 4 is aligned with a marking indicative of that certain period of time which is imprinted, or otherwise embossed, on the peripheral surface of the drum 3 while viewing it through the display window 5. Subsequently, the switch 8 is depressed to supply the electric power to the magnetron. The timer device 6 is driven during this predetermined period of time and, upon the lapse of the predetermined period of time, it halts operation with the pointer needle 4 returned to the OFF position.

Referring now to FIGS. 3 and 4(a) and (b), the rotary drum 3 has a pair of opposed ends integrally formed with axial projections 12 and 14 in alignment with the longitudinal axis of said drum 3, respectively. Mounted on these axial projections 12 and 14 and rigidly secured to the drum 3 is the drum operating ring 10 and another ring 11 of smaller diameter than that of the ring 10.

The drum 3 is rotatably supported in position by a chassis 21 through a pair of bearing blocks 13a and 13b rigidly secured to said chassis 21 and respectively receiving therein the axial projections 12 and 14 of the drum 3. As shown in FIGS. 4(a) and (b), the drum 3 is normally biased in one direction towards the bearing block 13a by a compression spring 15 which is mounted on the axial projection 14 and interposed between said ring 11 and said bearing block 13b, thereby to impart a sufficient friction to the rotation of the drum 3. A washer 16 of sufficient size is provided between the bearing block 13b and the compression spring 15 for facilitating a smooth rotation of the drum 3, thereby to avoid a possibility that the corresponding end extremity of the compression spring 15 may be caught by a portion of the bearing block 13b.

In the instance shown in FIG. 3, the drum 3 is imprinted on its peripheral surface with a time scale under the heading of TIME in addition to various markings indicative of, for example, menus and the number of a particular food item under the same menu while, in the instance shown in FIG. 4(a), a separate time scale 17 is used and horizontally suspended from the chassis 21.

Referring still to FIG. 3, the timer operating shaft 18 has a drive wheel 19 non-rotatably mounted thereon in a manner as will be described later, rotation of the timer operating shaft 18 being transmitted to the pointer needle 4 through said drive wheel 19 by means of a cable 20. A plurality of idle pulleys 22, 23, 24, 25 and 26 are rotatably supported by the chassis 21 for guiding the cable 20. As clearly shown in FIG. 3, the cable 20 has a pair of opposed ends connected with each other by a tension spring 27 and suspended around the pulleys and the drive wheel in the order of 25, 24, 23, 22, 19 and 26.

In the above arrangement, as the operating knob 7 is turned or during the operation of the timer device 6, the cable 20 runs with the tension spring 27 moving between two positions respectively locating adjacent to the ends of the rotary drum 3.

The chassis 21 is formed as at 28 and 29 with a pair of downward projections each terminating at a position adjacent to the linear path of travel of the tension spring 27. These downward projections 28 and 29 are provided for facilitating a procedure of suspending the cable 20 around the pulleys 22 to 26 via the drive wheel 19, which will be hereinafter described with reference to FIGS. 5(a) and (b).

As shown in FIGS. 5(a) and (b), the cable 20 has each end tied to provide a loop 30 and 31 of a size sufficient enough to permit the corresponding projection 28 and 29 to extend therethrough as shown in FIG. 5(a) during the cable suspending procedure. The space between these projections 28 and 29 is greater than the length of the tension spring 27 without being loaded and substantially equal to the length of the tension spring 27 loaded so as to exert on the cable 20 a sufficient tension to ensure a stable movement of the pointer needle 4 connected with the cable 20 in a manner as will be described later.

Operation of these downward projections 28 and 29 are as follows. First, one loop 30 must be formed at the corresponding end of the cable 20 and then engaged with the projection 28. After the cable 20 has been passed through the pulleys 25, 24, 23 and 22, then the drive wheel 19 and finally the pulley 26, in the order given above, the other loop 31 should be formed at the corresponding end of the cable 20 and then engaged with the other projection 29 without permitting the cable 20 to be loosened. While the loops 30 and 31 of the cable 20 are respectively engaged with the projections 28 and 29 of the chassis 21, one end of the tension spring 27 should be connected with either of these loops 30 or 31 and the other end of the tension spring should be subsequently connected with the other loop 31 or 30 while a single attendant worker engaged in the assemblage of the electronic oven pulls the tension spring 27. This condition is illustrated in FIG. 5(a).

What is required to do thereafter is to disengage the loops 30 and 31 from the corresponding projections 28 and 29, as shown in FIG. 5(b).

From the foregoing, it is clear that the provision of the projections 28 and 29 in the chassis is advantageous in that only the single attendant worker can perform the cable suspending procedure.

FIG. 6 illustrates a manner of connection of the movable pointer needle 4 to the cable 20. The chassis 21 is mounted with a guide rail 34 of substantially channel-shaped cross section, which extends horizontally between the pulleys 23 and 24. This guide rail 34 carries thereon a block 32 slidable along said guide rail 34 and to which the pointer needle 4 is secured. The block 32 is rigidly mounted with a fitting plate 33 which is in turn connected with the cable 20 as clearly shown in FIG. 6, in such a manner that the block 32 can be pressed towards the guide rail 34 by the tension exerted by the cable 20 thereby to ensure a stable movement of the pointer needle 4. Preferably, the size of the fitting plate 33 is greater than that of the block 32 so that the pressing force transmitted from the cable 20 to the block 32 can be uniformly distributed to said block 32 to ensure a more stable movement of the pointer needle 4 without causing the latter to incline during the movement.

FIGS. 7 to 10 illustrate the details of the drive wheel 19 and a manner of connection of the cable 20 to said drive wheel 19. Referring first to FIG. 7, the drive wheel 19 mounted on the timer operating shaft 18 is so positioned that a portion of the cable 20 between the pulleys 22 and 26 after having passed round the drive wheel 19 extends in alignment with the tangential direction of the drive wheel 19. This arrangement is advantageous in that no substantial force derived from the tension imposed on the cable 20 by means of the tension spring 27 is transmitted through the drive wheel 19 to the timer operating shaft 18, which may otherwise act on the shaft 18 in the direction perpendicular to the longitudinal axis of said shaft 18 if such force were applied to the drive wheel 19. Consequently, it is clear that the timer operating shaft 18 can be smoothly rotated, without requiring an excessive force to rotate the knob 7 and without reducing the life of the timer device 6.

As shown in FIG. 8, the pulleys 22 and 26 respectively positioned substantially above and below the drive wheel 19 are displaced in the opposite directions from the plane of the drive wheel 19. This is achieved by displacing the planes of flanges 21a and 21b formed integrally with the chassis 21 and to which the pulleys 22 and 26 are rotatably fitted. While the pulleys 22 and 26 are displaced from the plane of the drive wheel 19 as hereinbefore described, the width of a guide groove formed along the periphery of said drive wheel 19 around which the cable 20 is wound is greater than the difference between the level of the plane of the flange 21a and that of the flange 21b. This is for the purpose of avoiding a cross-over of portions of the cable 20 which extend in alignment with the tangential direction of the drive wheel 19. This cross-over of the cable 20 should be avoided in view of the fact that, if it were permitted to occur, the section of the cable 20 where the cross-over occurs will be worn out. The width of the peripheral groove on the drive wheel 19 should be determined depending upon the number of winding of the cable 20 around said wheel 19 in such a way that windings of the cable 20 around the wheel 19 do not overlap with respect to each other within the peripheral guide groove.

Figure 9:
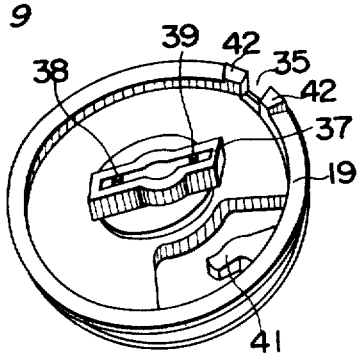
Figure 9:
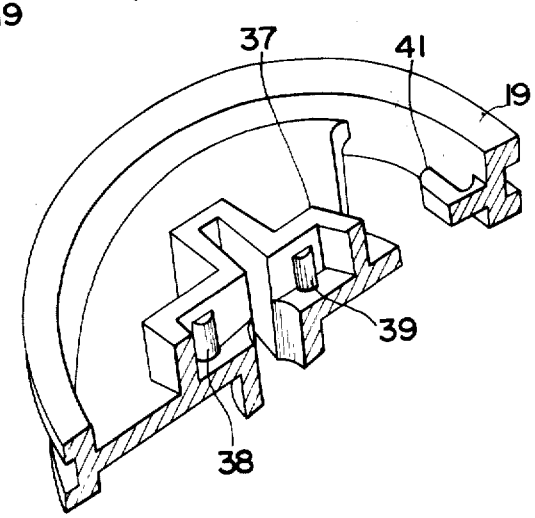
Figure 10:
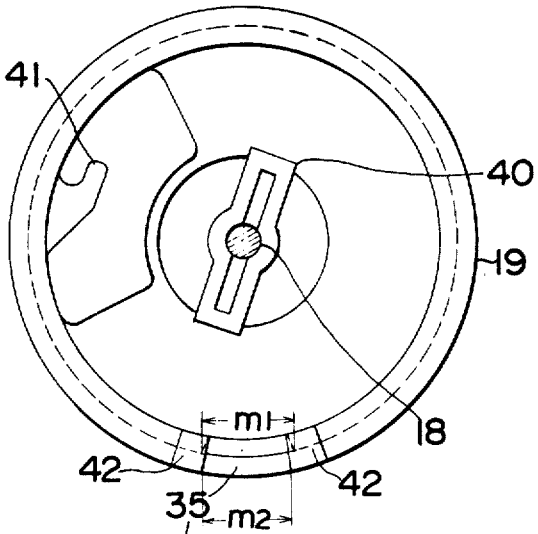
Figure 10:
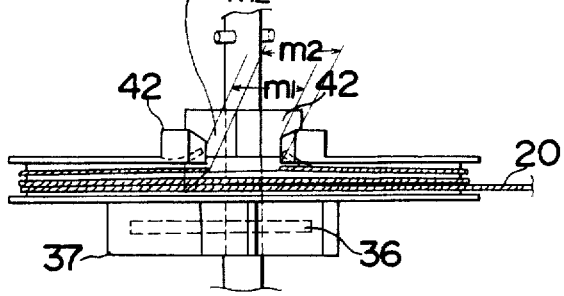
Figure 10:
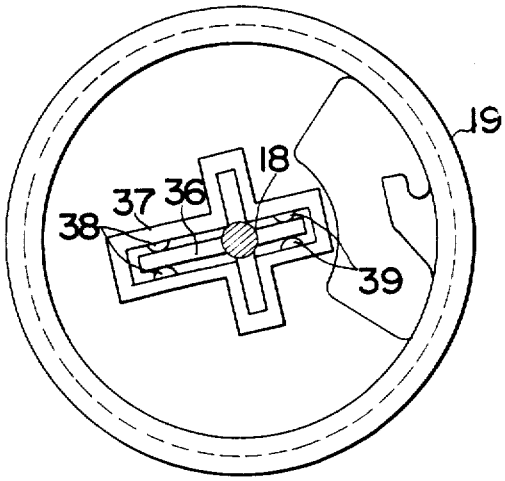

Referring now to FIGS. 9 and 10, in which the details of the drive wheel 19 are shown, it should be understood that the drive wheel 19 must be firmly mounted on the timer operating shaft 18 partly because, once it has been mounted on said shaft 18, there is no possibility of removing it from the shaft 18 and partly because, even if the drive wheel 19 is arbitrarily rotated in response to the rotation of the timer operating shaft 18, a notch 35 formed thereon should return to a predetermined position upon completion of the operation of the timer device 6. To this end, while the shaft 18 is provided with a pin 36 (FIG. 10(c)) extending therethrough at right angles to the longitudinal axis of said shaft 18, the drive wheel 19 is provided, on the surface facing towards the timer device 6, with a substantially rectangular hollow projection 37 having the interior wall formed with two pairs of protuberances 38 and 39 on both sides of the central hole of the drive wheel 19 through which the shaft 18 extends, each pair of protuberances facing towards each other. It is to be noted that the space between each pair of protuberances 38 and 39 is smaller than the diameter of the pin 36 whereby, when the drive wheel 19 is mounted on the shaft 18, the protuberances 38 and 39 are partially smashed to permit the pin 36 to be firmly sandwiched between the protuberances within the rectangular hollow projection 37.

Considering the mass-production of the electronic oven according to the present invention, there will be a possibility that the pin 36 is inserted through the shaft 18 with the longitudinal axis thereof displaced from the longitudinal axis of the operating shaft 18. In such case, the protuberances 38 and 39 located on the side in which the pin 36 has become displaced, may be partially scraped by a knife of the like to permit the pin 36 to be held in position within the projection 37.

The drive wheel 19 is formed on the other surface with a boss 40 through which the operating shaft 18 extends and also with a hook portion 41 adjacent to the periphery of said wheel 19 to which that portion of the cable 20 wound around said wheel 19 is engaged as shown in FIG. 7. The drive wheel 19 is also formed with the notch 35 substantially opposed to the hook portion 41 and a pair of projections 42 on both sides of said notch 35 which are projecting towards the instrument panel 2 from the plane of the wheel 19. These projections 42 are integrally formed with the drive wheel 19 by means of a plastic molding method during manufacture thereof and are provided for the purpose of permitting the attendant worker to successfully wind the cable 20 around the wheel 19 without causing the cable to be displaced from said wheel 19 in such a manner as indicated by the dotted lines in FIG. 10(b). To this end, the space $m_1$ between these projections 42 is made smaller than the space indicated by $m_2$ in FIG. 10(b).

From the foregoing description in connection with the first preferred embodiment of the present invention, it has now become clear that rotation of the timer operating knob 7 and, thus, the timer operating shaft 18 can be transmitted to the pointer needle 4 so as to slide the latter along the guide rail 34 whereby, by aligning the pointer needle 4 with any one of the markings on the peripheral surface of the drum 3, the required cooking time can be automatically set on the timer device 6. It is also clear that, upon completion of the operation of the timer device 6, i.e., after the lapse of the required cooking time, the pointer needle 4 can return to the initial or OFF position in readiness for the subsequent operation of the electronic oven.

Another embodiment shown in FIG. 11 is similar to the foregoing embodiment. However, rotation of the timer operating shaft 18 is, according to the embodiment of FIG. 11 transmitted not only to the movable pointer needle 4, but also to the drum 3 which has been described as manually rotatable in the foregoing embodiment.

To this end, the projection 12 of the drum 3, in this embodiment of FIG. 11, extends through the bearing block 13a and is mounted rigidly with a pulley 44 around which a portion of the cable 20 between the pulleys 24 and 25 is wound so that the movement of the cable 20 causes the drum 3 to rotate. This arrangement should be designed such that a substantially 360° rotation of the drum 3 occurs upon rotation of the operating shaft 18 from the OFF position to another position indicative of the maximum cooking time that can be set to the timer device 6. Furthermore, the markings indicative of menus which can be cooked in different times are preferably imprinted on the peripheral surface of the drum 3 so as to helically position thereon as shown in FIG. 11.

A system similar to the embodiment of FIG. 11 may be practiced in a manner as shown in FIG. 12, wherein the various pulleys, the drive wheel, the pointer needle, the cable and their associated parts that have been described as employed in the foregoing embodiments are eliminated. Instead, according to the embodiment shown in FIG. 12, a bevel gear system is employed. This bevel gear system comprises a first bevel gear 45 rigidly mounted on the operating shaft 18 and a second bevel gear 46 rigidly mounted on the projection 14 of the drum 3. Projection 14 is made to extends through the bearing block 13b, whereby rotation of the operating shaft 18 can be transmitted to the drum 3 through said first gear 45 via said second gear 46 in constant mesh with said first gear 45, thereby causing the drum 3 to rotate about the longitudinal axis thereof.

In the embodiment of FIG. 12, the time scale 17 that has been described as employed in the foregoing embodiments is also omitted and, instead thereof, an index mark 47 is preferably integrally formed with the instrument panel 2 so as to project into the window 5 as clearly shown.

Each of the foregoing embodiments shown in FIG. 11 and FIG. 12 has an advantage in that the cooking time required in cooking one particular food item can be set to the timer device 6 merely by rotating the timer operating shaft 18 until the pointer needle 4 in the embodiment of FIG. 11 or the index mark 47 in the embodiment of FIG. 12 is aligned with one of the markings which indicate the desired food item to be cooked.

FIGS. 13 to 16 show various types of a lighting device which are applicable with any of the foregoing embodiments of the present invention for illuminating the rotary drum 3. The provision of this lighting device is advantageous since this ensures that, at most, a very small portion of the peripheral surface of the drum 3, on which the various menus and the number and/or quantity of each of said menus are imprinted or otherwise embossed and which is exposed to the sight of the user through the window 5, will be shaded, which may in fact occur without the lighting device.

Referring first to FIG. 13, the drum 3 employed in this instance is preferably made of a light transmissive material, i.e., material of a nature which permits passage of light therethrough, and an elongated, substantially cylindrical lamp 48 is housed within said drum 3 in alignment with the longitudinal axis of said drum 3. For supplying electrical power from a suitable power source (not shown), the lamp 48 is inserted in a socket 49, which may be integrally formed with the bearing block 13b and concurrently serves as an axis about which said drum 3 rotates. A pair of lead wires 51 are extended through said bearing block 13b and connected to the lamp 48 through the socket 49. Rotation of the drum 3 incident to a turning of the operating ring 10 does not cause the lead wires 51 to twist about the axis of rotation of the drum 3.

In FIGS. 14(a) and (b), the drum 3 is similarly made of a light transmissive material and an electrical lamp 52 is positioned adjacent to the peripheral rim of that end of the drum 3 adjacent to the bearing block 13b so as to illuminate the drum 3. In this case, it is preferable to apply a coating of a white paint 54 on the inner peripheral surface of said drum while figures or characters representing the various menus and the number and/or quantity thereof are perforated on a film 53 of opaque material which is in turn applied to the outer peripheral surface of said drum 3. In this arrangement, rays of light emitted from the electrical lamp 52 travel as shown in FIG. 14(b) with portions of said light rays leaking through the perforated figure or characters on the film 53, thereby permitting the figure or characters to be illuminated.

Figure 15:
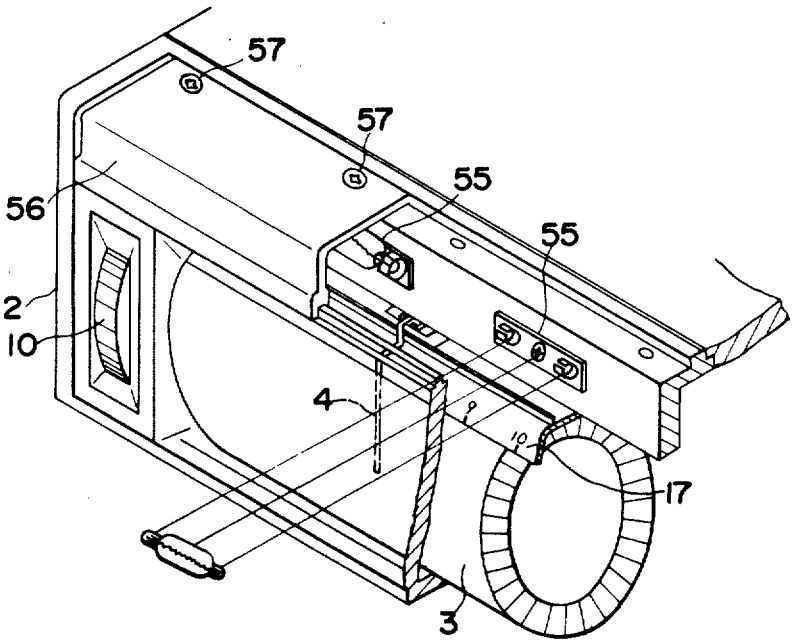
Figure 15:
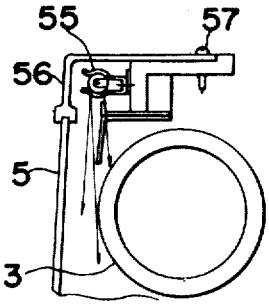

In the case where the rotary drum 3 is made of opaque material and it is desired not to mount the lamp within the drum 3 as is the case of FIG. 13, the following arrangements shown in FIGS. 15 and 16 are possible.

In the arrangement of FIG. 15, a plurality of electrical lamps 55 are provided substantially above the rotary drum 3 so as to illuminate the portion of the peripheral surface of the drum 3 exposed to the outside through the window 5. These lamps 55 are shielded from view by a removable covering 56 forming a part of the front instrument panel 2. Preferably, this covering 56 is fitted to the chassis 21 by means of a plurality of screws threaded thereto at 57 and can be removed, if these screws 57 are undone, for replacement of the exhausted lamp with a new one.

In the arrangement of FIG. 16, the rotary drum 3 is substantially encircled by a covering 59 having an opening 59a, said covering 59 being supported by the chassis 21 with said opening 59a in alignment with the window 5. A lamp 58 is secured to said covering 59 at the back of the drum 3 with respect to the opening 59a or the window 5 as clearly shown in FIG. 16(b). The interior surface of said covering 59 serves as a reflector so that rays of light emitted from the lamp 58 travel, reflected by said interior surface of said covering 59, to the portion of the drum 3 facing towards the window 5 thereby to illuminate that portion of said drum 3.

Instead of the use of the drum having the peripheral surface imprinted with the various menus and the number and/or quantity of each of the menus, which has been described as employed in the foregoing embodiments, employment of a plurality of cooking cards which can be selectively drawn from a casing attached to the front instrument panel 2 is possible. This will be hereinafter described with reference to FIG. 17 to FIG. 19.

Referring now to these drawings, the front instrument panel 2 above the door is detachably provided with a housing 62 for accommodating therein a plurality of cooking cards 60 and at least one casing 61 of a similar size to each of said cards 60 pivotally supported within said housing 62 in such a manner as will be described later. Each of these cooking cards 60 is imprinted on one surface with a plurality of menus and the cooking times respectively corresponding to the menus whereby the user can set the timer device 6 through the timer operating knob 7 while referring to a selected one of said cooking cards 60. The casing 61 is used to accommodate therein a sheet of paper or the like on which the user writes additional menus and the associated cooking times therefor which are not described on any one of the cooking cards 60.

Each of these cards 60 and the casing 61 is of a substantially rectangular shape and is manually pivotable between a locked position wherein it is housed within the housing 62 and concealed from view and another upright position wherein it stands upright and is exposed to the sight of the user. For enabling the user to move each of these cards and the casing, respectively integrally formed with index knobs 60a and 61a, which are always exposed to the sight of the user even though the card 60 or the casing 61 is in the locked position.

FIG. 18 illustrates the interior of the housing 62 after it has been removed from the instrument panel 2. As shown in FIG. 18, the housing 62 is integrally formed with a substantially cylindrical projection 63 on which the cards 60 and the casing 61 are rotatably mounted. It is to be noted that the position of the cylindrical projection 63 with respect to the housing 62 and the hole formed in each of the cards 60 and the casing 61 for permitting the projection 63 to pass therethrough are to be selected such that a maximum of the surface area of each of the cards 60 or the casing 61 in the upright position can be exposed to the outside of the housing 62. For this purpose, as viewed from FIG. 18, the projection 63 is located at a position adjacent to the upper right corner of the configuration of the housing 62.

Referring still to FIG. 18, the casing 61 is shown as conditioned in the upright position and apparently tends to pivot to the locked position by its own gravity. It is clearly undesirable if the casing 61, once moved to the upright position, moves back to the locked position by its own gravity. To avoid this, a leaf spring 65 is provided. This leaf spring 65 has one end portion held in position within the housing 62 by means of a plurality of posts 67 and the other end portion bent to provide a feeler 65a collapsibly engageable in a recess 64 formed in each of the cards 60 and the casing 61. Positioned above the feeler 65a of the leaf spring 65 is a stopper 66 integrally formed with the housing 62 for preventing each of the cards 60 and the casing 61 from being excessively rotated beyond the upright position.

In the above arrangement, if one desires to raise one of the cards 60 and the casing 61 from the locked position to the upright position causing it to rotate about the projection 63, the feeler 65a of the leaf spring 65 relatively slides along the corner edge of said card 60 or casing 61, biased thereto by its own resiliency, and finally clicks into the recess 64, formed in each of the cards 60 and the casing 61, whereby the card 60 or casing 61 thus raised to the upright position can be held in said upright position with the stopper 66 restricting the further rotation thereof beyond said upright position.

As will be described later, the housing 62 with cards 60 and casing 61 therein is detachably fitted to the instrument panel 2 for permitting the user to clean, as desired, the housing 62, the cards 60 and the casing 61. So far as the arrangement is such as hereinbefore described, there will be a difficulty in re-mounting the housing 62 with cards 60 and casing 61 therein to the instrument panel 2 once they have been removed from said panel 2. For avoiding this, the leaf spring 65 is substantially bogged or hogged at the center, as shown by the dotted line in FIG. 18, of the end portion thereof accommodated in between each of the posts 67 and a corresponding side flange of the housing 62 whereby said leaf spring 65 is firmly held in position within said housing 62 and is not removed therefrom.

Hereinafter, a method of reliably and effectively mounting the cards 60 and the casing 61 to the cylindrical projection 63 of the housing 62 will be described with reference to FIGS. 18 and 19. When the housing 62 is to be mounted to the instrument panel 2, the cards 60 and casing 61 are first mounted on the cylindrical projection 63. In view of this, when the housing 62 with cards 60 and casing 61 therein is to be mounted to the instrument panel 2, there will be a possibility that some of the cards 60 and/or the casing 61 become disengaged from the cylindrical projection 63. To avoid this, while the outer diameter of the cylindrical projection 63 is made slightly smaller than the diameter of the hole formed in each of the cards 60 and the casing 61, the cylindrical projection 63 is integrally formed with one or more, for example, four, projections 68, 69, 70 and 71 circumferentially equidistantly spaced with respect to each other and protruding in the direction at right angles to the longitudinal axis of said projection 63. In addition, the length of the cylindrical projection 63 is made slightly greater than the sum of thicknesses of the cards 60 and the casing 61. In this arrangement, although a relatively great pushing force is required in mounting each card 60 and casing 61 on the cylindrical projection 63 of the housing 62, none of the cards 60 and casing 61 will become detached therefrom once they have been thus mounted because of the projections 68 to 71. In addition, even when the housing 62 with cards 60 and casing 61 therein is removed from the instrument panel 2 for cleaning, no cards 60 and casing 61 will arbitrarily disengage from the cylindrical projection 63 of the housing.

A method of mounting the housing 62 with cards 60 and casing 61 therein to the instrument panel 2 will be hereinafter fully described with reference to FIGS. 19 to 21. As shown, the housing 62 is integrally formed with a plurality of engagements such as indicated by 72, 74, 76, 80 for engagement into corresponding openings 73, 75, 77 and 81 formed in the instrument panel 2. One of the engagements, such as indicated by 76 is arrow-headed while the cylindrical projection 63 is integrally formed with an arrow-headed engagement 78, both the arrow-headed engagements 76 and 78 serving as hooks and each having a sufficient resiliency as to permit the housing 62 with cards 60 and casing 61 to be, when mounted to the instrument panel 2, firmly carried by said panel 2 in a predetermined position in a manner clearly shown in FIG. 19. In other words, when the housing 62 with cards 60 and casing 61 therein is to be mounted to the instrument panel 2, the engagements 72, 74 and 80 are first engaged into the corresponding openings 73, 75 and 81 in the instrument panel 2 and, then, an external pushing force is applied to the housing 62 to allow the arrow-headed engagement 76 and 78 to be elastically inserted into the corresponding openings 77 and 79 until said arrow-headed engagements 76 and 78 engage the peripheral edges of the openings 77 and 79, respectively. FIG. 19 clearly illustrates the condition in which the arrow-headed engagement 78 is held in position within the openings 79.

It is to be noted that, since the cylindrical projection 63 has a length slightly greater than the sum of thicknesses of the cards 60 and casing 61, a portion of the instrument panel 2 around the opening 79 is recessed to provide a space 79a for accommodating therein the lateral projections 68 to 71 on the free end of the cylindrical projections 63. Nevertheless, the depth of the interior of the housing 62 in which the cards 60 and the casing 61 are accommodated in the manner as hereinbefore described is determined depending upon the sum of the thicknesses of the cards 60 and casing 61 and should be selected such as to permit each of said cards 60 and casing 61 to be steadily moved from the locked position to the upright position about the substantially cylindrical projection 63 while backed up by the instrument panel 2 and the housing 62 from both sides thereof.

Preferably, the cylindrical projection 63 is formed with a cut-out portion as shown at 63a adjacent to the root of the arrow-headed engagement 78. This is particularly advantageous in that, in the case where the diameter of the hole in any one of the cards 60 and casing 61 is slightly smaller or greater than the outer diameter of the projection 63, the cut-out portion 63a provides a clearance whereby such card and/or casing can be effectively mounted within the housing 62 with the projection 63 extending through said hole. In addition thereto, the housing 62 including the various parts integrally formed with said housing 62 is preferably made of synthetic resin in a similar way as employed in manufacture of the instrument panel 2.

Removal of the housing 62 with cards 60 and casing 61 therein is not always effected only when cleaning is to be performed. For example, the same may be effected when some of the cards 60 and/or the casing 61 are to be replaced by other cards.

What is illustrated in FIGS. 22(a) to (b) is an arrangement wherein the rotary drum 3, that has been described as employed in the first preferred embodiment of the present invention with reference to FIGS. 3 to 10, is replaced with a plurality of interchangeable cooking scales 82.

As clearly shown in FIG. 22(c), each of these cooking scales 82 is in the form of a substantially rectangular strip, preferably made of synthetic resin, and has the front face imprinted with a plurality of menus and the cooking times required in cooking the respective menus. A similar imprinting may be made on the back face of said scale 82. The cooking times imprinted on the cooking scale 82 provides, in the same way as in the foregoing embodiment shown in either FIGS. 3 to 10 or FIG. 11, the positions for movement of the pointer needle 4, to which reference is made by the user in setting the timer device 6.

For interchangeably accommodating a selected one of the cooking scales 82 in position with respect to the window 5, the instrument panel 2 of the electronic oven positioned above the hingedly supported door 1a is double-walled at a portion corresponding to the window 5, thereby providing an inlet 2a and a space 2b into which each of said scales 82 is selectively inserted, said inlet 2a being located at a position remote from and opposed to that portion of the instrument panel 2 through which the timer operating shaft 18 extends.

Instead of providing the cooking times on each of the interchangeable cooking scales 82, the time scale shown in FIGS. 4(a), 6, 11, 13, 14(a) and 15(b), which is commonly designated by 17, may be nevertheless employed in the embodiment of FIGS. 22(a) to (c).

The embodiment of FIGS. 22(a) to (c) is advantageous in that, while the peripheral surface of the drum 3 in the foregoing embodiments is naturally limited by the diameter of said drum 3, the menus with or without corresponding cooking times can be displayed in a greater number than that can be imprinted, or otherwise embossed, on the drum 3, depending upon the number of the interchangeable cooking scales 82.

The embodiment shown in FIG. 23 to FIG. 27 employs a belt of synthetic film having one surface, exposed to the sight of the user, imprinted with the various menus and the number and/or quantity of each of these menus, which is an alternative of either the drum or the cooking scale. Before the description of this embodiment proceeds, it is to be noted that a system for moving the pointer needle 4 may be substantially the same as employed in the foregoing embodiment of FIGS. 3 to 10 and, therefore, the details thereof are herein omitted for the sake of brevity.

Referring first to FIGS. 23(a) and (b), the instrument panel 2 is provided with a circular opening 9a (FIG. 27) instead of the employment of the rectangular opening 9 in the foregoing embodiments wherein the drum 3 is employed. Extending through said circular opening 9a is a shaft 84 having one end exposed outside the instrument panel 2 and mounted with an operating knob 83 and the other end rigidly mounted with a bevel gear 85, said shaft 84 being rotatably supported at a substantially intermediate portion by the chassis 21 by means of a bracket 94 rigidly secured to said chassis 21. A pair of elongated rolls 89 positioned roll 90. The rolls have formed on both ends thereof to each other, each of which is formed on both ends thereof corresponding shaft members which are in turn journalled to bearing members 95 and 96, respectively. The members 95 and 96 are, in turn, secured to the chassis 21 by means of a plurality of screws such as indicated by 97. Each of these rolls 89 and 90 is biased towards the bearing member 95 by a compression spring 108 disposed on the corresponding shaft member of the roll between that end thereof and the bearing member 96 and functioning in the same way as the compression spring 15 shown in FIGS. 4(a) and (b).

These rolls 89 and 90 are rotatable in the same direction in synchronism with respect to each other in response to rotation of the operating knob 83. For this purpose, a gear 87 on a connecting rod which has one end rigidly mounted with said gear 87 and the other end with a bevel gear 86 in constant mesh with the bevel gear 85, a substantially intermediate portion of said connecting rod being rotatably supported by the bearing member 95, is meshed on both sides thereof with a pair of driven gears 91 and 92 rigidly mounted respectively on the corresponding shaft members of the rolls 89 and 90 between the ends of said rolls 89 and 90 and said bearing member 95.

Suspended between said rolls 89 and 90 is the belt 88 of synthetic film having one end connected with either the roll 89 or the roll 90 and the other connected with the other roll 90 or 89 and having a length greater than the distance between said two rolls 89 and 90. This belt 88 has one surface exposed towards the window 5 and imprinted on said surface with the various menus and the number and/or quantity of each of said menus as clearly shown in FIG. 23(b).

From the foregoing arrangement, it is clear that rotation of the operating knob 83 is transmitted to the rolls 89 and 90, thus causing the latter to rotate in the same direction in synchronism with each other with either of these rolls 89 and 90 acting to wind up the belt 88 while the other roll acting to release the belt. As a result of this, the different menus and the number and/or quantity thereof imprinted on the surface of said belt 88 are successively shifted between said rolls 89 and 90 from above or bottom depending upon the direction of rotation of the operating knob 83.

For avoiding a possible fluttering of a portion of the belt 88 located between said rolls 89 and 90, a back-up plate 98 is suspended between the bearing members 95 and 96 which extends behind said belt 88. This back-up plate 98 is preferably made of transparent or semi-transparent synthetic material for the reason as will be described.

As is well known to those skilled in the art, most electronic ovens now commercially available are provided with an electrical lamp for illuminating the interior of the oven-defining structure. The electrical lamp is, as indicated by 100 in FIG. 25, usually positioned above the ceiling panel forming a part of the oven-defining structure. In the embodiment of FIGS. 23 to 27, this electrical lamp 100 may be employed for concurrently illuminating the belt 88 of synthetic film as clearly shown in FIG. 25.

For the above purpose, the chassis 21 should be, as at 21d, opened to permit rays of light from said lamp 100 to travel towards the belt 88 through the back-up plate 98. In this case, no extra electrical lamp other than the lamp 100 initially intended to illuminate the interior of the oven-defining structure is required.

There will be a possibility that the belt 88 becomes dirty during the service of the electronic oven in a kitchen where the humidity is relatively high, in which case the menus and other informations on the surface of the belt 88 cannot be clearly represented. To avoid this, a pair of cleaning members 101, each made of felt cloth or brush, are provided; one being rigidly carried by the time scale 17 and facing towards the belt 88 and the other being rigidly carried by the back-up plate 98 and facing towards said belt 88 as clearly shown in FIG. 24. The two cleaning members 101 sandwich said belt 88 in cooperation with each other whereby, each time said belt 88 is moved between the rolls 89 and 90, both surfaces of said film can be swept.

However, there is also a possibility that, during frequent sweeping the belt surfaces by means of the cleaning members 101, some or all of the menus and the other informations imprinted on the surface of said belt 88 are erased therefrom. To avoid this disadvantage, it is preferable to provide a protective film 103 applied on the relevant surface of the belt 88 by the use of a suitable known adhesive material thereby preventing the cleaning member 101 from contacting the surface of the belt 88 on which the menus and the other informations are imprinted.

In the case where the belt 88 of synthetic film is divided into, for example, three portions respectively carrying thereon types, the number and/or quantity of the menus to be re-heated, cooked and defrosted by the electronic oven, rotation of the operating knob 83 is preferably limited to a substantial angle of 360°. For this purpose, the shaft 84 is provided with a pin 105 extending at right angles to the longitudinal axis of said shaft 84 said pin 105 cooperating with a stopper 106, which is integrally formed with the bracket 94. This shaft 84 is also provided with a pin 104 for rigid connection with the operating knob 83 mounted on said shaft 84. Disposed on the instrument panel 2 around the opening 9a through which the shaft 84 extends is an indication of the purposes of use of the electronic oven which corresponds to the three portions of the belt 88.

In the above arrangement, it is clear that the rotation of the operating knob 83 and, thus, the shaft 84 is limited to the angle of approximately 360°. As shown in FIG. 23(b), the operating knob 83 is preferably provided thereon with an index marking 83a for visually indicating to the user what portion of the belt 88 is aligned with the window 5.

It is to be noted that the belt 88 may be employed in the form of an endless belt.

The embodiment of FIGS. 28(a) and (b) illustrates that a plurality of cooking scales 109, each having one surface imprinted with the various menus and the corresponding number and/or quantity with or without the respective cooking times, are selectively attached to the instrument panel 2 by the effect of magnetic attraction.

Referring to these drawings, this embodiment employs the same system of moving the pointer needle 4 in response to rotation of the timer operating knob 7. However, the instrument is provided with a magnetic member 110, either in the form of a magnetic strip or in the form of a plurality of magnetic pieces, arranged below the plane of movement of the pointer needle 4. For attaching each of the cooking scales 109 to said magnetic member 110 on the instrument panel 2, each cooking scale 109 may be made of metallic material, or otherwise may be plated on the opposite surface with a metallic member, either in the form of a metallic strip or in the form of a plurality of metallic pieces corresponding to the magnetic pieces if employed. Alternatively, in the case where the instrument panel 2 is made of metallic material, each cooking scale 109 has the opposite surface plated with the magnetic member.

In the foregoing embodiment of FIGS. 23(a) and (b), each cooking scale 109 is associated with the pointer needle 4 in a similar manner as in the embodiment of FIGS. 22(a) to (c). However, if each of the interchangeable cooking scales 109 is provided on the opposite surface with the magnetic member, it can be used in any type of conventional electronic oven if the latter has at least one metallic portion within the sight of the user.

Of course, the greater the number of the interchangeable cooking scales 109, the greater the menus and the number and/or quantity of each of said menus can be imprinted thereon. The embodiment of FIGS. 28(a) and (b) is an example in which the cooking time adjusting device according to the present invention can be manufactured at lower cost than required in any of the foregoing embodiment.

From the foregoing full description of the present invention, it has now become clear that the cooking time adjusting device enables the user to feel comfortable about handling the electronic oven. Furthermore, it permits a beginner of cooking to readily operate or use the electronic oven without substantially requiring any experience in handling the oven.

Although the present invention has been fully described, it is to be noted that various changes and modifications are apparent to those skilled in the art. Therefore, unless otherwise they depart from the true scope of the present invention, they should be construed as included within said scope of the present invention.

What is claimed is:

1. A cooking time adjusting arrangement for use in an electronic oven, said arrangement being utilized in an electronic oven including an oven-defining structure having an access opening, means positioned for generating high frequency energy toward the interior of said oven-defining structure and a hingedly supported door for [ selectively ] covering the access opening of said oven-defining structure, said adjusting arrangement comprising:

a timer device having an operating shaft for setting the timer to any desired operating period, said means for generating high frequency energy being operatively coupled to said timer device and operating during said operation period;

an instrument panel having a front and back and positioned on said oven-defining structure and having a window portion and an aperture therein, said timer device being positioned adjacent the back of said panel and said operating shaft of said timer extending through said aperture;

a movable pointer needle, operatively coupled to said operating shaft and positioned to move along said window portion for indicating the operating time of said means for generating high frequency energy; and display means positioned behind said window portion for visually representing various information relating to menus, corresponding cooking times and operating time, said display means comprised of a rotatable drum, the peripheral surface thereof having said information thereon.

[ 2. A cooking time adjusting arrangement as claimed in claim 1, wherein said display means comprises a plurality of interchangeable strip members each having at least one surface carrying said informations, said strip members being capable of being selectively mounted to said instrument panel so as to display said informations on each of said strip members through said window portion. ]

[ 3. A cooking time adjusting arrangement as claimed in claim 2, wherein said strip members are selectively insertable in said instrument panel so as to display said information on each of said strip members through said window portion. ]

[4. A cooking time adjusting arrangement as claimed in claim 2, wherein each of said strip members is capable of being selectively fitted to said instrument panel by the effect of magnetic attraction. ]

[5. A cooking time adjusting arrangement as claimed in claim 1, wherein said display means comprises a pair of synchronously rotatably supported rolls spaced one above the other in equidistantly spaced relation with respect to each other, means for rotating said rolls in the same direction in synchronism with respect to each other, a belt wound around each of said rolls and having one front surface carrying said informations, said belt being shiftable upon rotation of any one of said rolls. ]

[6. A cooking time adjusting arrangement as claimed in claim 5, further comprising a cleaning device for sweeping said belt to keep the latter clear. ]

[7. A cooking time adjusting arrangement as claimed in claim 5, wherein said belt has said front surface applied with a protective film. ]

[8. A cooking time adjusting arrangement as claimed in claim 5, wherein said belt is made of transparent synthetic material and further comprising an electrical light positioned backwards of said belt and above the ceiling of said oven-defining structure for illuminating said belt and the interior of said oven-defining structure. ]

*9. A cooking time adjusting arrangement as claimed in claim 1, wherein said rotatable drum is biased in one direction by a compression spring mounted on a shaft of said drum.*

*10. A cooking time adjusting arrangement as claimed in claim 1, wherein said drum is made of transparent material and further comprising an electrical lamp for illuminating said drum, said lamp being housed within said drum.*

*11. A cooking time adjusting arrangement as claimed in claim 10, wherein said drum is rotatably supported by a socket for supplying a power therethrough to said lamp.*

*12. A cooking time adjusting arrangement as claimed in claim 10, wherein said lamp is operatively positioned to project rays of light to the peripheral rim of said drum.*

*13. A cooking time adjusting arrangement as claimed in claim 1, further comprising an electrical lamp for lighting said drum, said lamp being disposed between said instrument panel and said drum, said instrument panel being removable from the body of the electronic oven.*

*14. A cooking time adjusting arrangement as claimed in claim 1, wherein said drum is covered by a covering having an opening in register with said window portion and further comprising an electrical lamp positioned behind said drum for illuminating said drum, rays of light emitted from said lamp being transmitted to said opening by being reflected by the inner surface of said covering.*

*15. The device of claim 1 wherein said rotatable drum is coupled to said operating shaft and driven thereby synchronously with said pointer needle, information being arranged on said drum in numerical order according to required cooking times whereby said pointer will be appropriately positioned for the information displayed.*

*16. A cooking time adjusting arrangement as claimed in claim 1, wherein said pointer needle is coupled to said operating shaft by a cable and moves in response to rotation of said operating shaft, said pointer needle moving in parallel relation to the longitudinal axis of said drum along said window.*

*17. A cooking time adjusting arrangement as claimed in claim 16, wherein a drive wheel mounted on said operating shaft and a plurality of idle pulleys, two of said idle pulleys being positioned on opposite sides of said drive wheel are provided such that a first portion of said cable entering said drive wheel and a second portion of said cable emerging from said drive wheel are aligned in a straight line with respect to each other.*

*18. A cooking time adjusting arrangement as claimed in claim 17, wherein said two of said idle pulleys are rotatably supported by a fixed member such that said two pulleys are respectively frontwardly and rearwardly displaced with respect to the plane of said drive wheel.*

*19. A cooking time adjusting arrangement as claimed in claim 16, wherein said pointer needle is connected with said cable by means of a block slidably mounted on a guide rail, said block having a member for securing said cable to said block at both ends thereof, both ends thereof projecting from said block in the direction of movement of said slidable block.*

*20. A cooking time adjusting arrangement as claimed in claim 16, wherein said cable has both ends connected by means of a tension spring and further including a pair of projections extending from a fixed member within the stroke of movement of said tension spring for facilitating connection between said ends of said cable by means of said tension spring.*

*21. A cooking time adjusting arrangement as claimed in claim 8, wherein said drive wheel has one face formed with a hollow projection, the interior of said hollow projection being formed with a plurality of pairs of opposed protrusions for firmly securing a pin provided on the operating shaft thereby permitting the drive wheel to be rigidly and firmly mounted in position on said operation shaft.*

*22. A cooking time adjusting arrangement as claimed in claim 17, wherein said drive wheel is formed on its periphery with a notch and a pair of projections on both sides of said notch, each of said projections projecting from the plane of said wheel in the direction parallel to the longitudinal axis of said operating shaft.*

* * * * *